United States Patent
Ang et al.

(10) Patent No.: US 12,483,307 B2
(45) Date of Patent: Nov. 25, 2025

(54) ANTENNA GROUPING FOR MULTIPLE-INPUT-MULTIPLE-OUTPUT (MIMO) SYSTEMS

(71) Applicant: QUALCOMM Incorporated, San Diego, CA (US)

(72) Inventors: Peter Pui Lok Ang, San Diego, CA (US); Ahmed Omar Desouky Ali, Santa Clara, CA (US); Chitaranjan Pelur Sukumar, San Jose, CA (US); Yuanning Yu, Santa Clara, CA (US); Zae Yong Choi, San Jose, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 18/051,366

(22) Filed: Oct. 31, 2022

(65) Prior Publication Data
US 2024/0146368 A1    May 2, 2024

(51) Int. Cl.
*H04B 17/15*   (2015.01)
*H04B 7/06*    (2006.01)
*H04B 17/10*   (2015.01)

(52) U.S. Cl.
CPC ......... *H04B 7/0602* (2013.01); *H04B 17/102* (2015.01); *H04B 17/15* (2015.01)

(58) Field of Classification Search
CPC .............................. H04B 17/102; H04B 17/15
See application file for complete search history.

(56) References Cited

U.S. PATENT DOCUMENTS

| | | | |
|---|---|---|---|
| 2016/0203036 A1* | 7/2016 | Mezic | G06F 11/0751 714/819 |
| 2018/0337716 A1 | 11/2018 | Fakoorian et al. | |
| 2020/0136711 A1 | 4/2020 | Cao | |

FOREIGN PATENT DOCUMENTS

| EP | 4040900 A1 * | 8/2022 | H04L 1/0036 |
|---|---|---|---|
| WO | WO-02080380 A1 * | 10/2002 | H04B 7/0604 |

OTHER PUBLICATIONS

International Search Report and Written Opinion—PCT/US2023/075936—ISA/EPO—Jan. 29, 2024.

* cited by examiner

*Primary Examiner* — Dang T Ton
(74) *Attorney, Agent, or Firm* — Guang Y. Zhang; Patterson & Sheridan LLP

(57) ABSTRACT

Certain aspects of the present disclosure provide a method for wireless communications by a wireless device. The wireless device evaluates a plurality of antenna group combinations based on one or more criteria wherein each antenna group combination includes at least two antenna groups of multiple antennas and the one or more criteria involve a first performance value calculated separately for each antenna group in an antenna group combination under evaluation and a second performance value calculated collectively for the at least two antenna groups in the antenna group combination under evaluation. The wireless device selects a subset of the plurality of antenna group combinations, based on the evaluation.

30 Claims, 10 Drawing Sheets

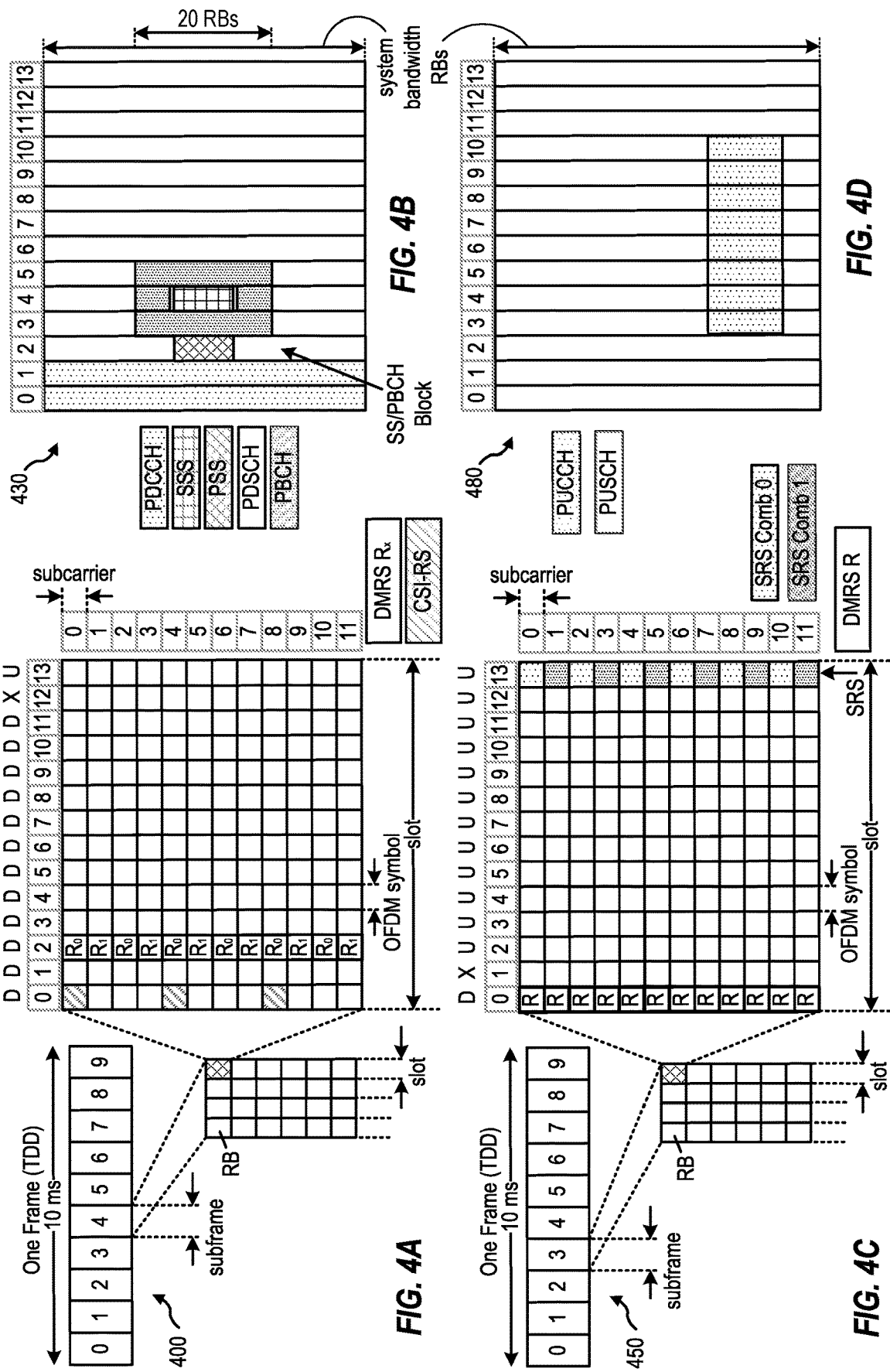

510

Evaluating a plurality of antenna group combinations based on one or more criteria, wherein each antenna group combination comprises at least two antenna groups of multiple antennas and the one or more criteria involve a first performance value calculated separately for each antenna group in an antenna group combination under evaluation and a second performance value calculated collectively for the at least two antenna groups in the antenna group combination under evaluation

520

Selecting a subset of the plurality of antenna group combinations, based on the evaluation A method for wireless communications by a wireless device

*FIG. 5*

ANTENNA GROUPING FOR MULTIPLE-INPUT-MULTIPLE-OUTPUT (MIMO) SYSTEMS

BACKGROUND

Field of the Disclosure

Aspects of the present disclosure relate to wireless communications, and more particularly, to techniques for managing grouping of antennas in a multiple-input-multiple-output (MIMO) system.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a wireless device, comprising: evaluating a plurality of antenna group combinations based on one or more criteria, wherein each antenna group combination comprises at least two antenna groups of multiple antennas and the one or more criteria involve a first performance value calculated separately for each antenna group in an antenna group combination under evaluation and a second performance value calculated collectively for the at least two antenna groups in the antenna group combination under evaluation; and selecting a subset of the plurality of antenna group combinations, based on the evaluation.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIGS. 5 and 6 depict methods for wireless communications by a wireless device.

DETAILED DESCRIPTION

Aspects of the present disclosure provide apparatuses, methods, processing systems, and computer-readable mediums for managing grouping of antennas in a multiple-input-multiple-output (MIMO) system.

MIMO systems are those that have multiple antennas at both a transmitter device and a receiver device. The multiple antennas in the MIMO systems can be used in different ways, that is, the creation of a highly effective antenna diversity system and the use of the antennas for the transmission of several parallel data streams to increase the capacity of the MIMO systems.

Antenna diversity takes advantage of multiple diverse paths between transmit and receive antennas to increase the quality and reliability of wireless communications. The multiple antennas may have differentiation on functionalities and performance to support a higher order antenna diversity. For example, it is usually not desirable to have requirements that all the antennas supporting the higher order antenna diversity should meet the same performance and/or functionalities. For example, some antennas may be implemented with a higher insertion loss than other antennas. Accordingly, there are some incentives and benefits to group the antennas, in accordance with the differentiation on the functionalities and performance of the antennas.

Aspects of the present disclosure describes an antenna grouping technique to perform grouping of antennas, in accordance with differentiation on functionalities and performance associated with the antennas. For example, the antenna grouping technique may be implemented to perform grouping of 8 receive (Rx) antennas of a MIMO system into two 4 Rx antenna groups. The process for how to group the 8 Rx antennas into the two 4 Rx antenna groups may be based at least on a spectral efficiency (i.e., the spectral efficiency of each of the two 4Rx antenna groups as well as a combined spectral efficiency of both 4Rx antenna groups).

The grouping of antennas using the antenna grouping technique proposed herein may improve throughput performance of the MIMO system. For example, the antenna grouping technique may improve downlink throughput performance (e.g., by maximizing an overall spectral efficiency). In another example, the antenna grouping technique may improve uplink throughput performance (e.g., by assigning transmit (Tx) operation to a group of 4 Rx antennas within the two 4Rx antenna groups that may have a higher performance).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
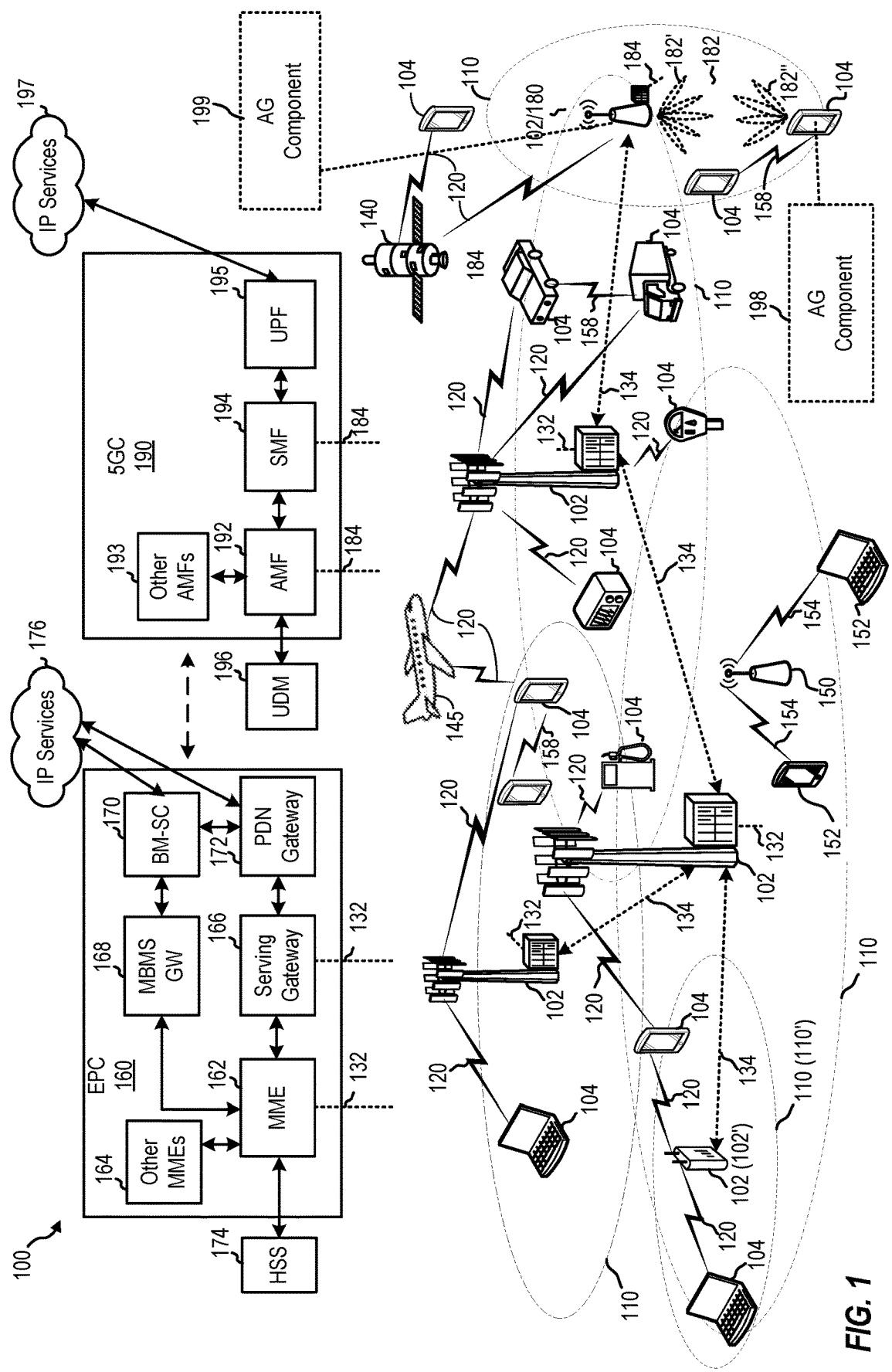
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
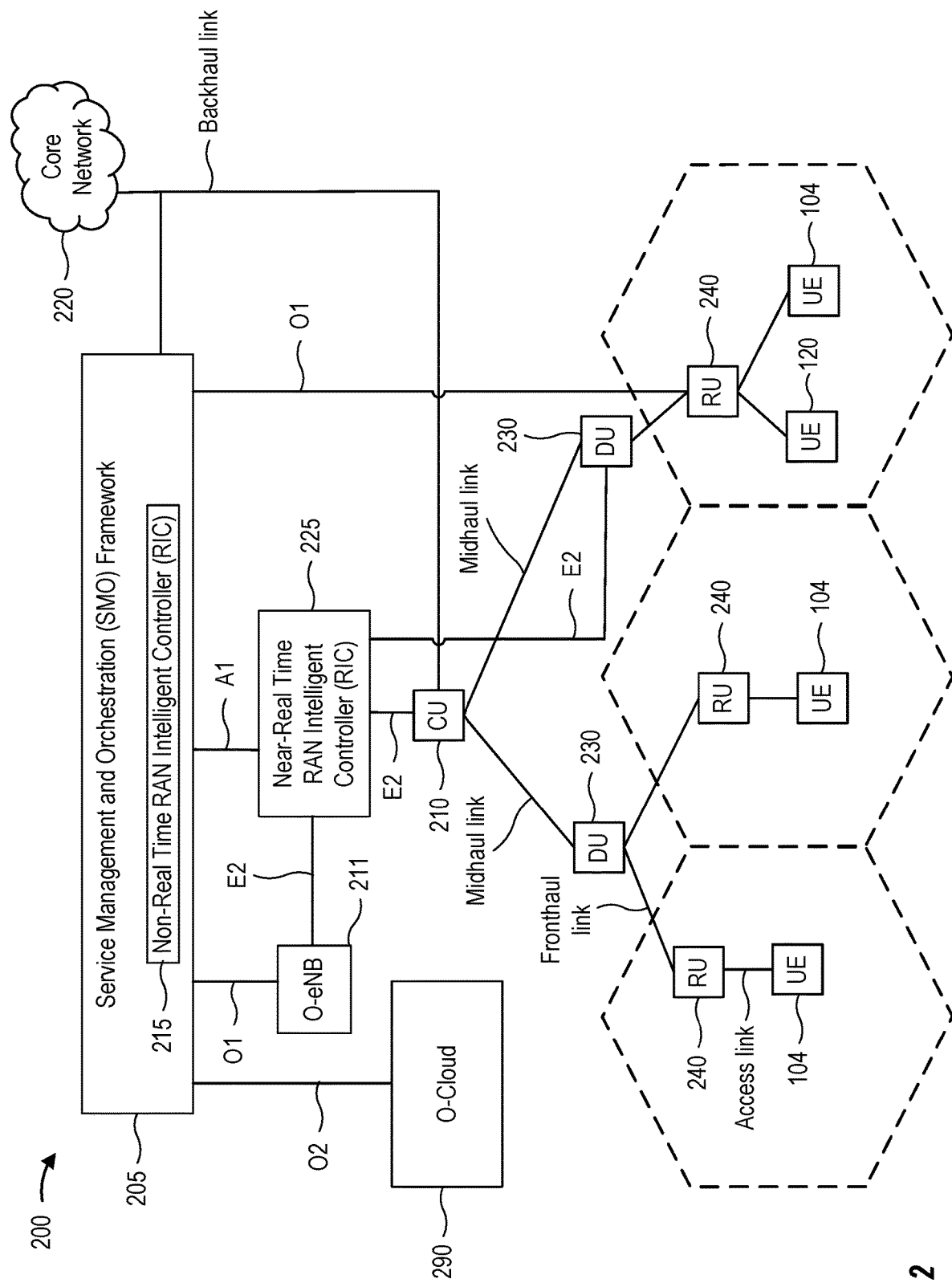
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5 G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 6:
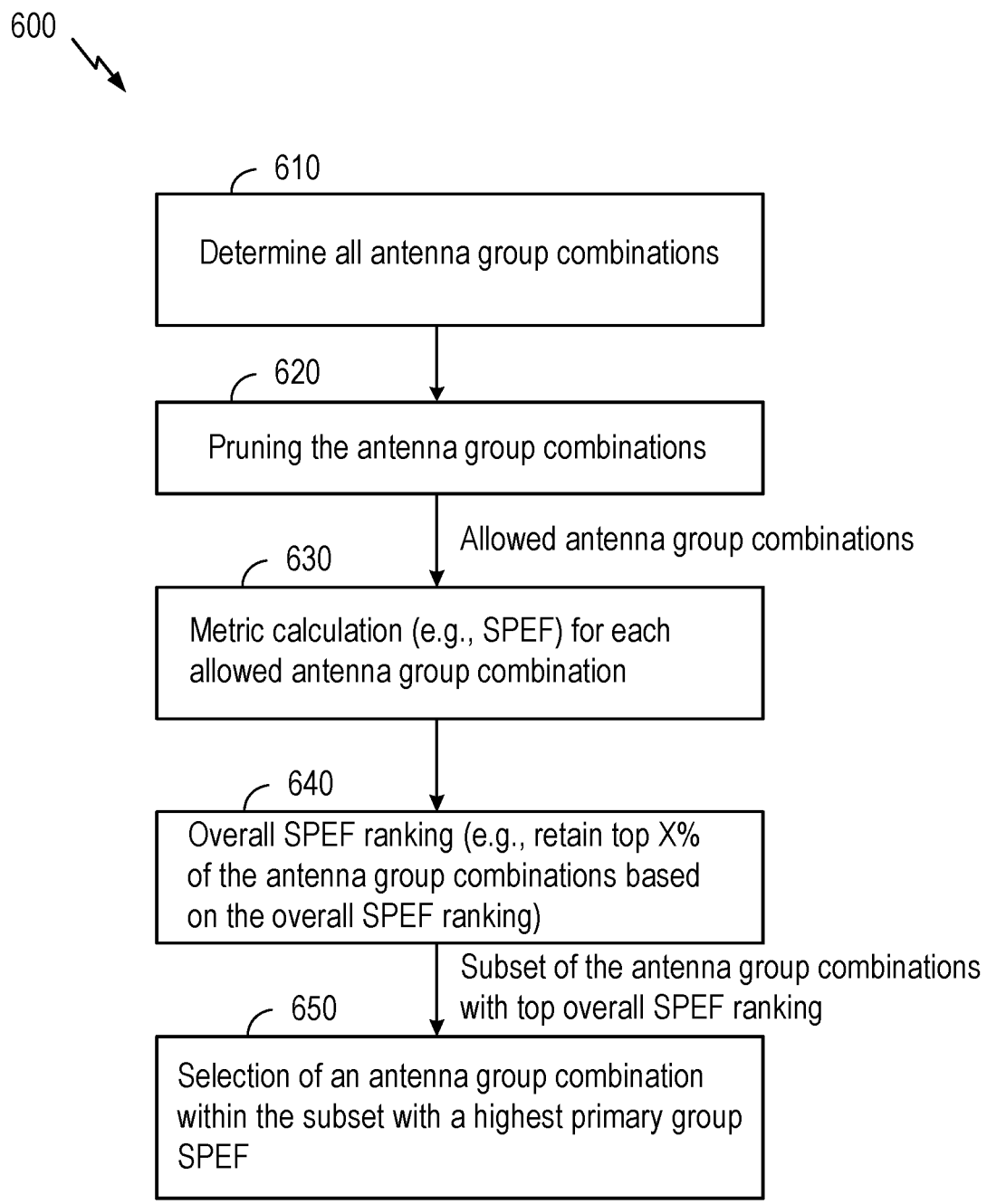

Wireless communication network 100 further includes antenna grouping (AG) component 198, which may be configured to perform method 500 of FIG. 5 and/or method 600 of FIG. 6. Wireless communication network 100 further includes AG component 199, which may be configured to perform method 500 of FIG. 5 and/or method 600 of FIG. 6.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
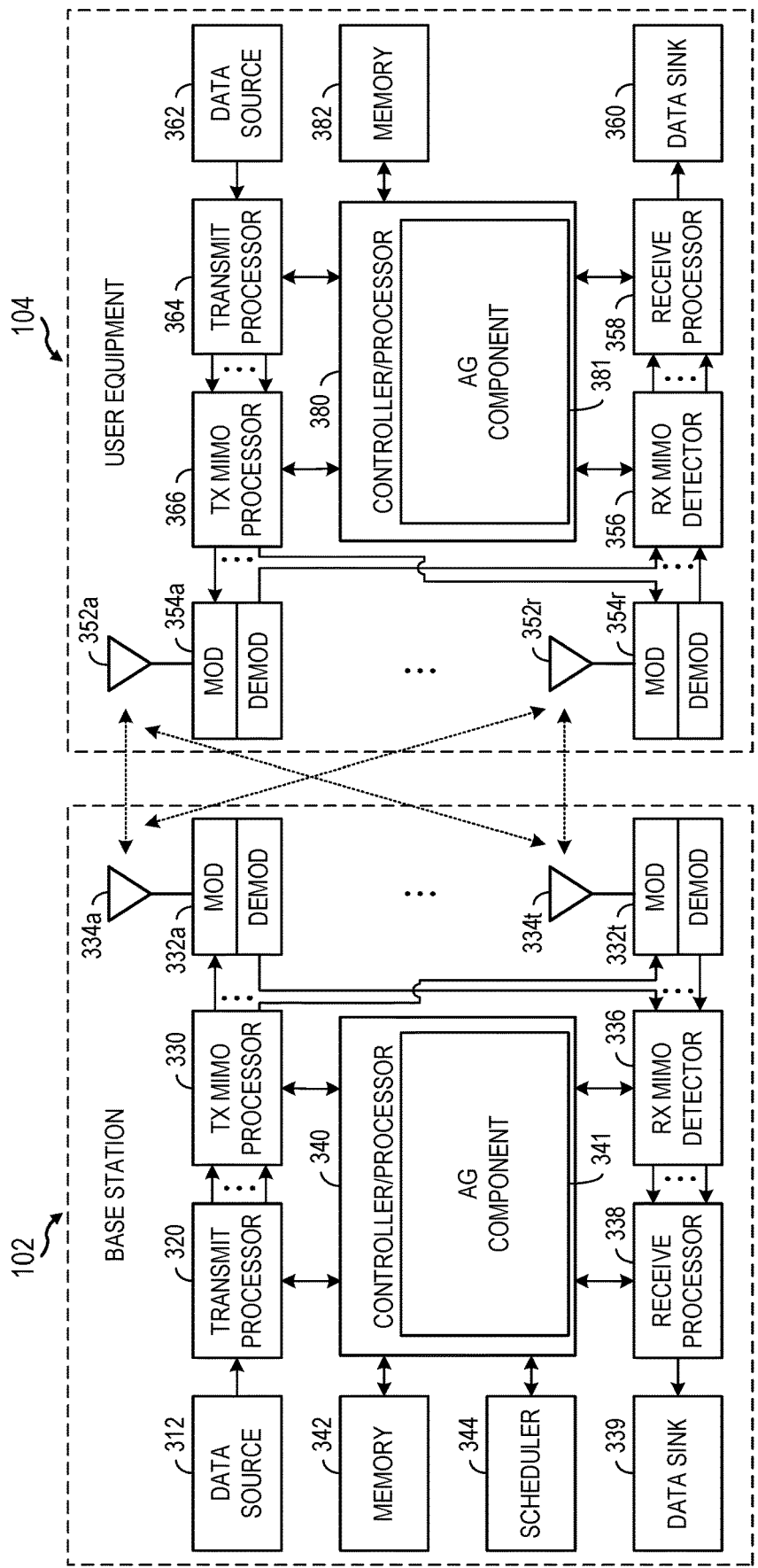
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes AG component 341, which may be representative of AG component 199 of FIG. 1. Notably, while depicted as an aspect of controller/processor 340, AG component 341 may be implemented additionally or alternatively in various other aspects of B S 102 in other implementations.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes AG component 381, which may be representative of AG component 198 of FIG. 1. Notably, while depicted as an aspect of controller/processor 380, AG component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu} \times 15$ kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Example Multiple-Input-Multiple-Output (MIMO) Systems and Antenna Grouping (AG) Techniques Multiple-input-multiple-output (MIMO) systems are those that have multiple antennas at both a transmitter device and a receiver device. The multiple antennas in the MIMO systems can be used in different ways, that is, the creation of a highly effective antenna diversity system and the use of the multiple antennas for the transmission of several parallel data streams to increase the capacity of the MIMO systems.

Antenna diversity may be used in wireless systems to combat the effects of fading. When multiple, independent copies of a same signal are available, these copies can be combined into a total signal with a high quality. The different signal copies are linearly combined, i.e., weighted and added. The resulting signal at the combiner output can then be demodulated and decoded in the usual way.

The antenna diversity process increases the quality and reliability of a wireless link. For example, the process uses multiple antennas to increase the quality and reliability of wireless communications. The multiple antennas may have differentiation on functionalities and performance to support a higher order antenna diversity. For example, it is usually not desirable to have requirements that all the antennas supporting the higher order antenna diversity should meet the same performance and/or functionalities. For example, some antennas may be implemented with a higher insertion loss than other antennas. In another example, the antennas may be positioned such that in a potential scenario of blocking (e.g., either due to hand or body) of the antennas, not all the antennas are blocked equally. Accordingly, there are incentives and benefits to group the antennas, in accordance with the differentiation on the functionalities and performance.

There are different techniques to perform grouping of the antennas. One antenna grouping (AG) technique is an adaptive receive diversity (ARD) technique. Another AG technique is an antenna switching diversity (ASDIV) technique.

The ARD technique may be implemented to perform various functions, such as, selection of a subset of antennas to be used for reception based on various conditions. For example, the ARD technique may be implemented to detect long term antenna imbalance and turn off a weaker antenna if an imbalance is greater than an imbalance threshold. Turning off the weaker antenna may improve power saving of a wireless device including these antennas and may also improve performance of the wireless device. In another example, the ARD technique may be implemented to detect high antenna correlations and turn off one antenna if the correlation is greater than a correlation threshold. The correlation is based on an estimate of a long term antenna correlation. Per the ARD technique, the reducing of a number of active antennas (such as receive (Rx) antennas (e.g., from 4Rx to 2Rx)) for operation may result in power saving of the wireless device. In some cases, when the wireless device is operating with the reduced number of antennas, a subset of the reduced number of antennas can be selected (e.g., grouped) to optimize the performance of an antenna system of the wireless device.

The ASDIV technique performs switching of antennas of an antenna system of a wireless device (e.g., to achieve receive diversity for uplink communications or transmit diversity for downlink communications). There are various scenarios in which different antennas of the antenna system used as primary receive and diversity antennas may be switched. For example, the behavior of the wireless device including these antennas may vary depending on how the wireless device is held. For example, a primary antenna may be blocked compared to a diversity antenna depending on the position of the wireless device. Therefore, better transmission quality may be obtained when transmit antennas of the antenna system are switched. The benefits of the ASDIV include improved network capacity, reduced current consumption, lower transmit (Tx) power, and/or lesser power allocation to a channel under a power control. In some cases, the ASDIV may be implemented to improve uplink performance through using the antennas associated with a lowest pathloss (e.g., highest receive signal receive power (RSRP)) for transmission. In some cases, the ASDIV may be implemented to select the antennas for transmission based on a performance value of the antennas (e.g., RSRP of the antennas).

In new radio (NR), at least 2 downlink MIMO layers must be used and a maximum number of 4 downlink MIMO layers are allowed. The MIMO layer corresponds to a data stream. A number of MIMO layers is always less than or equal to a number of antennas. So, given that the maximum number of allowed DL MIMO layers is 4 in a MIMO system, a higher order Rx antenna diversity for the MIMO system may be realized by using more than 4 Rx antennas. For example, 8 Rx antenna diversity may be implemented for the MIMO system. The higher order Rx antenna diversity may also apply to other number higher than 4 such as 6 Rx antenna diversity, 12 Rx antenna diversity, etc. To have the higher order antenna diversity for the MIMO system, a process of using 8 Rx antennas in the MIMO system (e.g., for the 8 Rx antenna diversity) is different from selecting best Rx antennas using the ARD (e.g., since all available 8Rx antennas in the MIMO system have to be used simultaneously).

In some cases, the usage of the 8 Rx antennas in the MIMO system may increase processing complexity. Accordingly, to reduce the processing complexity, the 8 Rx antennas in the MIMO system may be divided into legacy size antenna blocks (e.g., two 4 Rx antenna groups). The present disclosure describes a new AG technique to manage grouping of the 8 Rx antennas of the MIMO system into the two 4 Rx antenna groups.

Aspects Related to New Antenna Grouping Technique

Aspects of the present disclosure provide apparatuses, methods, processing systems, and computer-readable mediums for managing grouping of antennas in a multiple-input-multiple-output (MIMO) system.

For example, a new antenna grouping technique may be implemented to perform grouping of 8 receive (Rx) antennas of a MIMO system into two 4 Rx antenna groups. The process for how to group the 8 Rx antennas into the two 4 Rx antenna groups is based at least on a spectral efficiency (i.e., the spectral efficiency of each of the two 4Rx antenna groups as well as a combined spectral efficiency of both 4Rx antenna groups).

The antenna grouping technique may improve throughput performance of the MIMO system. For example, the antenna grouping technique may improve downlink throughput performance (e.g., by maximizing an overall spectral efficiency). In another example, the antenna grouping technique may improve uplink throughput performance (e.g., by assigning transmit (Tx) operation to a group of 4 Rx antennas within the two 4Rx antenna groups that may have a higher performance).

The antenna grouping technique proposed herein may be understood with reference to FIGS. 5-10. FIG. 5 illustrates example method 500 for wireless communication. The method 500 may be performed, for example, by a wireless device.

In one example, the wireless device may be a network entity (e.g., such as BS 102 in wireless communication network 100 of FIG. 1). In such cases, the method 500 are implemented as software components that are executed and run on one or more processors (e.g., controller/processor 340 of FIG. 3). Further, transmission and reception of signals by the network entity in the method 500 may be enabled, for example, by one or more antennas (e.g., antennas 334 of FIG. 3). In certain aspects, the transmission and/or reception of signals by the network entity are implemented via a bus interface of one or more processors (e.g., the controller/processor 340) obtaining and/or outputting signals.

In another example, the wireless device may be a UE (e.g., such as UE 104 in wireless communication network 100 of FIG. 1). In such cases, the method 500 are implemented as software components that are executed and run on one or more processors (e.g., controller/processor 380 of FIG. 3). Further, transmission and reception of signals by the UE in the method 500 may be enabled, for example, by one or more antennas (e.g., antennas 352 of FIG. 3). In certain aspects, the transmission and/or reception of signals by the UE are implemented via a bus interface of one or more processors (e.g., the controller/processor 380) obtaining and/or outputting signals.

The method 500 begin, at 510, by evaluating a plurality of antenna group combinations based on one or more criteria. Each antenna group combination comprises at least two antenna groups of multiple antennas and the one or more criteria involve a first performance value calculated separately for each antenna group in an antenna group combination under evaluation and a second performance value calculated collectively for the at least two antenna groups in the antenna group combination under evaluation.

In one example, the wireless device may evaluate the plurality of antenna group combinations, using a processor, antenna(s) and/or transmitter/transceiver components of B S 102 shown in FIG. 1 or FIG. 3 and/or of the apparatus shown in FIG. 11. In another example, the wireless device may evaluate the plurality of antenna group combinations, using antenna(s) and/or receiver/transceiver components of UE 104 shown in FIG. 1 or FIG. 3 and/or of the apparatus shown in FIG. 11.

At 520, the wireless device selects a subset of the plurality of antenna group combinations, based on the evaluation. In some cases, the wireless device further selects an antenna group combination within the subset of the plurality of antenna group combinations having at least one of: a highest first performance value or a highest second performance value.

In one example, the wireless device may select the antenna group combination within the subset of the plurality of antenna group combinations, using a processor, antenna(s) and/or transmitter/transceiver components of BS 102 shown in FIG. 1 or FIG. 3 and/or of the apparatus shown in FIG. 11. In another example, the wireless device may select the antenna group combination within the subset of the plurality of antenna group combinations, using antenna(s) and/or receiver/transceiver components of UE 104 shown in FIG. 1 or FIG. 3 and/or of the apparatus shown in FIG. 11.

Note that FIG. 5 is just one example of a method, and other methods including fewer, additional, or alternative steps are possible consistent with this disclosure.

FIG. 6 illustrates example method 600 for wireless communication. The method 600 may be performed, for example, by a wireless device.

At 610, the wireless device determines a total number of antenna group combinations for multiple antennas (e.g., Rx antennas for Rx operations). Each antenna group combination includes at least two antenna groups of the multiple antennas. The at least two antenna groups for each antenna group combination include a primary antenna group and one or more secondary antenna groups. For example, the wireless device may determine 70 total antenna group combinations of the primary antenna group (e.g., with 4 antennas) and the secondary antenna group (e.g., with 4 antennas) for creating two antenna groups of 4 antennas each out of 8 antennas.

At 620, the wireless device performs pruning of the total number of antenna group combinations. For example, the wireless device may select a plurality of antenna group combinations from the total number of antenna group combinations that satisfy a predefined condition. The predefined condition is satisfied when at least one antenna in at least one antenna group of an antenna group combination is configured for both Rx and Tx operations. For example, the wireless device may allow some of the total number of antenna group combinations for further evaluation due to the predefined condition being satisfied, and disallow some of the total number of antenna group combinations due to the predefined condition not being satisfied (e.g., some antenna group combinations may be disallowed when not all of the antennas in the primary antenna group can be used for both Rx and Tx operations, as this may impair downlink channel estimation by a network entity when sounding reference signal (SRS) antenna switching is enabled).

At 630, the wireless device calculates a first performance value separately for each antenna group in each antenna group combination within the plurality of antenna group combinations. For example, the wireless device may calculate the first performance value such as a spectral efficiency value, a signal to noise ratio value, and/or a rank value separately for the primary antenna group and the secondary antenna group in each antenna group combination within the plurality of antenna group combinations. The wireless device may consider antenna correlation to calculate the spectral efficiency value.

The wireless device also calculates a second performance value collectively for the at least two antenna groups in each antenna group combination within the plurality of antenna group combinations. For example, the wireless device may calculate the second performance value such as a spectral efficiency value, a signal to noise ratio value, and/or a rank value collectively for the primary antenna group and the secondary antenna group in each antenna group combination within the plurality of antenna group combinations.

At 640, the wireless device selects a subset of the plurality of antenna group combinations, based on the second performance value for each antenna group combination within the plurality of antenna group combinations. For example, the subset of the plurality of antenna group combinations may be top X percent of the plurality of antenna group combinations, based on the second performance value for each antenna group combination within the plurality of antenna group combinations.

In certain aspects, the wireless device selects an antenna group combination within the plurality of antenna group combinations, based on the second performance value for each antenna group combination within the plurality of antenna group combinations. For example, the wireless device may select the antenna group combination within the plurality of antenna group combinations that may have a highest second performance value.

At 650, the wireless device selects an antenna group combination within the subset of the plurality of antenna group combinations, based on the first performance value for the primary antenna group in each antenna group combination within the subset of the plurality of antenna group combinations. For example, the wireless device may select the antenna group combination within the subset of the plurality of antenna group combinations that may have a highest first performance value for the primary antenna group.

In certain aspects, to support a higher order antenna diversity, the wireless device may group the multiple antennas into multiple subsets of antennas with different priorities. The priorities may be used for distinguishing the antennas based on a functionality to support uplink transmission, downlink or uplink performance, and/or a functionality to support certain physical channels.

In certain aspects, the primary antenna group and the secondary antenna group for each antenna group combination within the total number of antenna group combinations include different sets of antennas. For example, the primary antenna group and the secondary antenna group for each antenna group combination are non-overlapping in terms of the antennas. For example, for a customer premise equipment (CPE) supporting 8 antennas, two groups of 4 antennas each may be created. That is, a group of 4 antennas as the primary antenna group and the other group of 4 antennas as the secondary antenna group.

In certain aspects, the primary antenna group and the secondary antenna group for each antenna group combination within the total number of antenna group combinations include at least a same subset of multiple antennas. For example, the primary antenna group and the secondary antenna group for each antenna group combination are overlapping in terms of some of the antennas.

In certain aspects, a first set of antennas of the multiple antennas in the primary antenna group for each antenna group combination within the total number of antenna group combinations are configured for both Rx and Tx operations. In certain aspects, a second set of antennas of the multiple antennas in the secondary antenna group for each antenna group combination are configured for Rx operations.

In certain aspects, a first set of antennas of the multiple antennas in the primary antenna group for each antenna group combination within the total number of antenna group combinations may support uplink MIMO operation (e.g., two simultaneous transmissions). In certain aspects, a second set of antennas of the multiple antennas in the secondary antenna group for each antenna group combination within the total number of antenna group combinations may not support the uplink MIMO operation (e.g., only up to one transmission or no transmission).

In certain aspects, a first set of antennas of the multiple antennas in the primary antenna group for each antenna group combination within the total number of antenna group combinations may have at least one of the first or second performance values beyond a threshold. In certain aspects, a second set of antennas of the multiple antennas in the secondary antenna group for each antenna group combination within the total number of antenna group combinations may have at least one of the first or second performance values less than the threshold.

For example, the first set of antennas in the primary antenna group may have higher downlink or uplink performance values than the second set of antennas in the secondary antenna group. The downlink performance values may include downlink reference signal receiver power values, downlink signal to noise ratio values, and/or downlink spectral efficiency values. The uplink performance values may include uplink pathloss estimate values (e.g., based on reciprocal estimate from the downlink reference signal receiver power values) and/or power headroom values.

In certain aspects, a first set of antennas of the multiple antennas in the primary antenna group for each antenna group combination within the total number of antenna group combinations may support a first set of physical channels. In certain aspects, a second set of antennas of the multiple antennas in the secondary antenna group for each antenna group combination within the total number of antenna group combinations may support a second set of physical channels, which are different from the first set of physical channels. For example, physical downlink control channel (PDCCH) transmissions reception, demodulation, and/or decoding is supported only on the first set of antennas in the primary antenna group. In another example, sidelink reference signal (SRS) transmissions are supported only on the first set of antennas in the primary antenna group.

In certain aspects, the wireless device may statically group the multiple antennas to form the at least two antenna groups for each antenna group combination within the total number of antenna group combinations, based on a hardware design of the wireless device and/or one or more first measurement values during a setup the wireless device.

In certain aspects, the wireless device may semi-statically group the multiple antennas to form the at least two antenna groups for each antenna group combination within the total number of antenna group combinations, based on information associated with an operation of a connection establishment of the wireless device. The information may be obtained during the connection establishment of the wireless device but does not change for the rest of the connection.

In certain aspects, the wireless device may dynamically group the multiple antennas to form the at least two antenna groups for each antenna group combination within the total number of antenna group combinations. For example, the wireless device may evaluate and periodically update the antenna groups during the connection.

In certain aspects, the wireless device may group the multiple antennas to form the at least two antenna groups for each antenna group combination within the total number of antenna group combinations, based on a hardware design of the wireless device, one or more first measurement values during a setup the wireless device, and/or one or more second measurement values during an operation of the wireless device.

In one example, the wireless device may perform the grouping of the multiple antennas to form the at least two antenna groups for each antenna group combination, based on an antenna insertion loss.

In another example, the wireless device may perform the grouping of the multiple antennas to form the at least two antenna groups for each antenna group combination, based on a field measurement value during the wireless device setup. For instance, when a CPE is installed, one or more tests may be performed to determine best antenna groups and keep the created antenna groups fixed (e.g., until next time the CPE is serviced again).

In another example, the wireless device may perform the grouping of the multiple antennas to form the at least two antenna groups for each antenna group combination, based on measurements during the operation of the wireless device. In one aspect, the measurements may include performance values measured during the connection establishment of the wireless device. In another aspect, the measurements may include performance values that are periodically measured and updated. This may result in dynamic updating of the created antenna groups. In another aspect, the measurements (e.g., with regards to optimizing downlink and/or uplink performance) may include reference signal receive power values of the antennas, signal to noise ratio values of the antennas, spectral efficiency values (e.g., estimated based on channel state information (CSI) reference signal (RS) values, downlink modulation reference signal (DMRS) values), and/or close-loop values associated with the wireless device (e.g., modulation coding scheme (MCS) values, channel rank values, and/or achieved throughputs obtained by experimentation on the created antenna groups).

Figure 7:
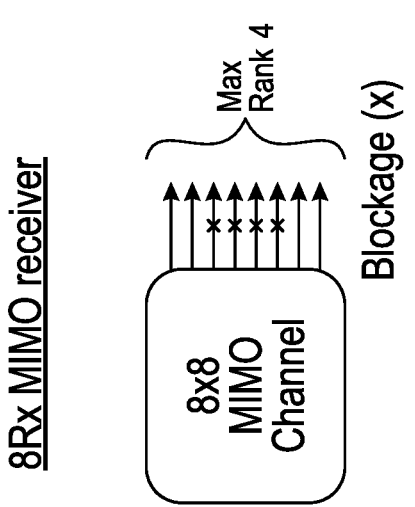
FIG. 7 depicts example 8 receive (Rx) antennas multiple-input-multiple-output (MIMO) receiver.

FIG. 7 depicts 8Rx antennas MIMO receiver of a wireless device. In this example MIMO receiver, 4 out of 8 Rx antennas are blocked. So, since only 4 Rx antennas are in operation, a maximum channel rank is 4 (i.e., a maximum of 4 data streams).

Figure 8:
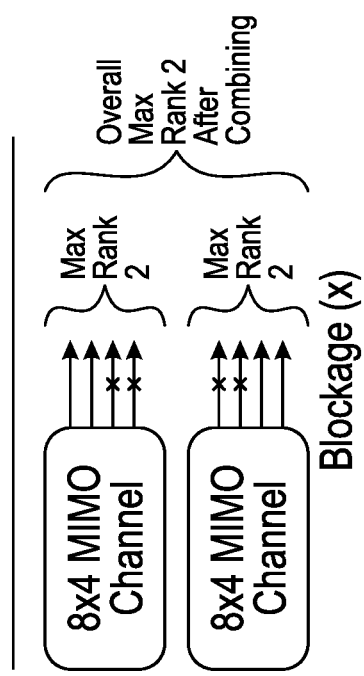
FIG. 8 depicts example 4Rx antennas MIMO receivers without grouping of antennas.

FIG. 8 depicts example 4Rx antennas MIMO receivers of a wireless device without grouping of antennas. In these example MIMO receivers, 2 out of 4 Rx antennas are blocked. So, since only 2 Rx antennas are in operation, a maximum channel rank for each MIMO receiver is 2 (i.e., a maximum of 2 data streams).

Figure 9:
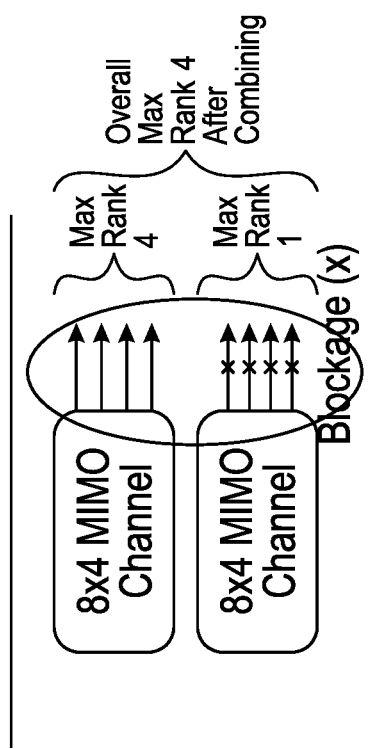
FIG. 9 depicts example 4Rx antennas MIMO receivers with grouping of antennas.

FIG. 9 depicts grouping of antennas in a MIMO receiver of a wireless device. For example, 4 out of 8 Rx antennas of the MIMO receiver may be blocked. Since only 4 Rx antennas are in operation, a maximum channel rank is 4 (i.e., a maximum of 4 data streams). The antenna grouping technique proposed herein may be implemented to create 2 antenna groups. For example, unblocked 4Rx antennas may be first grouped (and processed) as a primary 4Rx group (p4Rx), while other blocked 4Rx antennas may be grouped into a secondary 4Rx group (s4Rx). In accordance with the antenna grouping technique proposed herein, the 8 Rx antennas may then be regrouped to maximize overall spectral efficiency and p4Rx spectral efficiency. In operation, the wireless device may decode up to 4 layers through the 4Rx antennas within the p4Rx. The p4Rx (which may also include best 4Rx antennas based on spectral efficiency values) may drive loops and therefore better estimated parameters are reflected in a better performance of the MIMO receiver. In some cases, Tx antennas for uplink may be selected within the p4Rx (that is, antennas in the p4Rx may be used for Tx operations). This may result in a better uplink performance. The s4Rx may add some diversity gain to the performance of the MIMO receiver (e.g., high signal to noise ratio) through the combined processing of both the p4Rx and the s4Rx.

Other examples of MIMO receivers may include different number of antennas that are being blocked/fading (e.g., dynamically changing) and/or having a higher insertion loss (e.g., due to a static number of antennas based on original equipment manufacturers (OEM) implementation).

Example Communications Device

Figure 10:
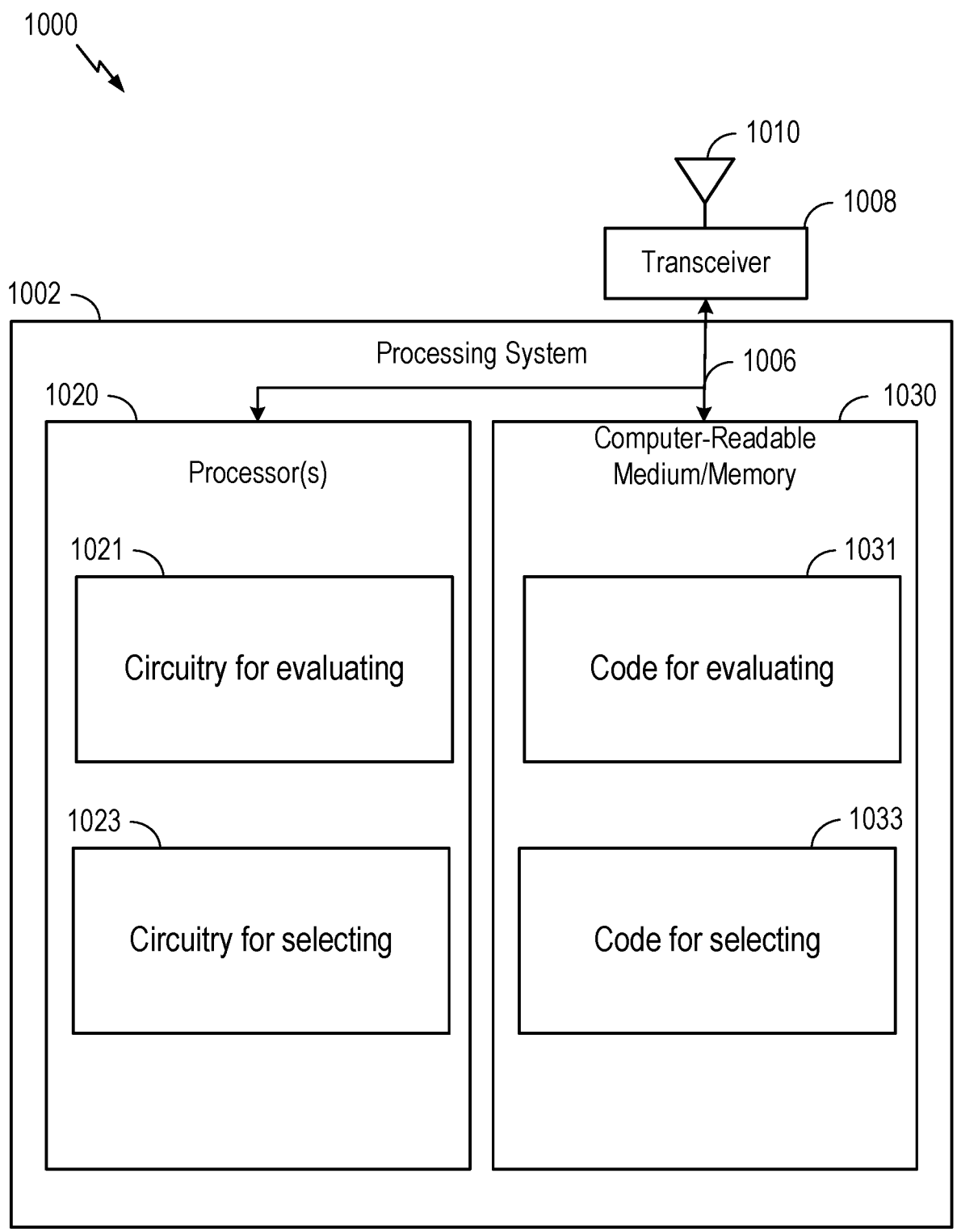
FIG. 10 depicts an example communications device.

FIG. 10 depicts aspects of an example communications device 1000. In some aspects, the communications device 1000 is a network entity, such as BS 102 of FIGS. 1 and 3, or a disaggregated BS as discussed with respect to FIG. 2. In some aspects, the communications device 1000 is a user equipment (UE), such as UE 104 described above with respect to FIGS. 1 and 3.

The communications device 1000 includes a processing system 1002 coupled to a transceiver 1008 (e.g., a transmitter and/or a receiver). In some aspects (e.g., when the communications device 1000 is a network entity), the processing system 1002 may be coupled to a network interface that is configured to obtain and send signals for the communications device 1000 via communication link(s), such as a backhaul link, midhaul link, and/or fronthaul link as described herein, such as with respect to FIG. 2. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may be representative of one or more of receive processor 358, transmit processor 364, TX MIMO processor 366, and/or controller/processor 380, as described with respect to FIG. 3. In various aspects, one or more processors 1020 may be representative of one or more of receive processor 338, transmit processor 320, TX MIMO processor 330, and/or controller/processor 340, as described with respect to FIG. 3. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform: the method 500 described with respect to FIG. 5, or any aspect related to it and/or the method 600 described with respect to FIG. 6, or any aspect related to it. Note that reference to a processor performing a function of the communications device 1000 may include the one or more processors 1020 performing that function of the communications device 1000.

In the depicted example, the computer-readable medium/memory 1030 stores code (e.g., executable instructions), such as code for evaluating 1031 and code for selecting 1033. Processing of the code for evaluating 1031 and the code for selecting 1033 may cause the communications device 1000 to perform: the method 500 described with respect to FIG. 5, or any aspect related to it and/or the method 600 described with respect to FIG. 6.

The one or more processors 1020 include circuitry configured to implement (e.g., execute) the code stored in the computer-readable medium/memory 1030, including circuitry such as circuitry for evaluating 1021 and circuitry for selecting 1023. Processing with the circuitry for evaluating 1021 and the circuitry for selecting 1023 may cause the communications device 1000 to perform: the method 500 described with respect to FIG. 5, or any aspect related to it and/or the method 600 described with respect to FIG. 6.

Various components of the communications device 1000 may provide means for performing: the method 500 described with respect to FIG. 5, or any aspect related to it and/or the method 600 described with respect to FIG. 6. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1108 and the antenna 1010 of the communications device 1000 in FIG. 11. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1008 and the antenna 1010 of the communications device 1000 in FIG. 10.

Example Clauses

Implementation examples are described in the following numbered clauses:

Clause 1: A method for wireless communications by a wireless device, comprising: evaluating a plurality of antenna group combinations based on one or more criteria, wherein each antenna group combination comprises at least two antenna groups of multiple antennas and the one or more criteria involve a first performance value calculated separately for each antenna group in an antenna group combination under evaluation and a second performance value calculated collectively for the at least two antenna groups in the antenna group combination under evaluation; and selecting a subset of the plurality of antenna group combinations, based on the evaluation.

Clause 2: The method alone or in combination with the first clause, further comprising selecting an antenna group combination within the subset of the plurality of antenna group combinations having at least one of: a highest first performance value or a highest second performance value.

Clause 3: The method alone or in combination with the first clause, further comprising: determining a total number of antenna group combinations for the multiple antennas, wherein each antenna group combination comprises the at least two antenna groups of the multiple antennas; and selecting the plurality of antenna group combinations from the total number of antenna group combinations that satisfy a predefined condition, wherein the predefined condition is satisfied when at least one antenna in at least one antenna group of an antenna group combination is configured for both receive and transmit operations.

Clause 4: The method alone or in combination with the first clause, wherein the at least two antenna groups for each antenna group combination comprise a primary antenna group and one or more secondary antenna groups.

Clause 5: The method alone or in combination with the first clause, wherein the first performance value and the second performance value correspond to spectral efficiency values.

Clause 6: The method alone or in combination with the first clause, wherein the first performance value and the second performance value correspond to signal to noise ratio values.

Clause 7: The method alone or in combination with the first clause, wherein the first performance value and the second performance value correspond to rank values of a radio channel.

Clause 8: The method alone or in combination with the first clause, wherein each antenna group of the at least two antenna groups for each antenna group combination comprises a same number of antennas.

Clause 9: The method alone or in combination with the first clause, wherein the at least two antenna groups for each antenna group combination comprise at least a same subset of the multiple antennas.

Clause 10: The method alone or in combination with the first clause, wherein the at least two antenna groups for each antenna group combination comprise different sets of antennas.

Clause 11: The method alone or in combination with the fourth clause, wherein: a first set of antennas of the multiple antennas in the primary antenna group of the at least two antenna groups for each antenna group combination are configured for both receive and transmit operations; and a second set of antennas of the multiple antennas in the one or more secondary antenna groups of the at least two antenna groups for each antenna group combination are configured for receive operations.

Clause 12: The method alone or in combination with the fourth clause, wherein: a first set of antennas of the multiple antennas in the primary antenna group of the at least two antenna groups for each antenna group combination have at least one of the first or second performance values beyond a threshold; and a second set of antennas of the multiple antennas in the one or more secondary antenna groups of the at least two antenna groups for each antenna group combination have at least one of the first or second performance values less than the threshold.

Clause 13: The method alone or in combination with the fourth clause, wherein: a first set of antennas of the multiple antennas in the primary antenna group of the at least two antenna groups for each antenna group combination support a first set of physical channels; and a second set of antennas of the multiple antennas in the one or more secondary antenna groups of the at least two antenna groups for each antenna group combination support a second set of physical channels.

Clause 14: The method alone or in combination with the first clause, further comprising statically grouping the multiple antennas to form the at least two antenna groups for each antenna group combination, based on at least one of: a hardware design of the wireless device or one or more first measurements during a setup the wireless device.

Clause 15: The method alone or in combination with the first clause, further comprising semi-statically grouping the multiple antennas to form the at least two antenna groups for each antenna group combination, based on information associated with an operation of a connection establishment of the wireless device.

Clause 16: The method alone or in combination with the first clause, further comprising dynamically grouping the multiple antennas to form the at least two antenna groups for each antenna group combination.

Clause 17: The method alone or in combination with the first clause, further comprising grouping the multiple antennas to form the at least two antenna groups for each antenna group combination based on at least one of: a hardware design of the wireless device; one or more first measurements during a setup the wireless device; and one or more second measurements during an operation of the wireless device.

Clause 18: An apparatus, comprising: a memory comprising executable instructions; and a processor configured to execute the executable instructions and cause the apparatus to perform a method in accordance with any one of Clauses 1-17.

Clause 19: An apparatus, comprising means for performing a method in accordance with any one of Clauses 1-17.

Clause 20: A non-transitory computer-readable medium comprising executable instructions that, when executed by a processor of an apparatus, cause the apparatus to perform a method in accordance with any one of Clauses 1-17.

Clause 21: A computer program product embodied on a computer-readable storage medium comprising code for performing a method in accordance with any one of Clauses 1-17.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A wireless device configured for wireless communications, comprising: one or more memories comprising instructions; and one or more processors, individually or in any combination, configured to execute the instructions and cause the wireless device to:
  evaluate a plurality of antenna group combinations based on one or more criteria, wherein each antenna group combination comprises at least two antenna groups of multiple antennas and the one or more criteria involve a first performance value calculated separately for each antenna group in an antenna group combination under evaluation and a second performance value calculated collectively for the at least two antenna groups in the antenna group combination under evaluation; and
  select a subset of the plurality of antenna group combinations, based on the evaluation.

2. The wireless device of claim 1, wherein the one or more processors, individually or in any combination, are is configured to execute the instructions and further cause the wireless device to select an antenna group combination within the subset of the plurality of antenna group combinations having at least one of: a highest first performance value or a highest second performance value.

3. The wireless device of claim 1, wherein the one or more processors, individually or in any combination, are is configured to execute the instructions and further cause the wireless device to:
  determine a total number of antenna group combinations for the multiple antennas, wherein each antenna group combination comprises the at least two antenna groups of the multiple antennas; and
  select the plurality of antenna group combinations from the total number of antenna group combinations that satisfy a predefined condition, wherein the predefined condition is satisfied when at least one antenna in at least one antenna group of an antenna group combination is configured for both receive and transmit operations.

4. The wireless device of claim 1, wherein the at least two antenna groups for each antenna group combination comprise a primary antenna group and one or more secondary antenna groups.

5. The wireless device of claim 1, wherein the first performance value and the second performance value correspond to spectral efficiency values.

6. The wireless device of claim 1, wherein the first performance value and the second performance value correspond to signal to noise ratio values.

7. The wireless device of claim 1, wherein the first performance value and the second performance value correspond to rank values of a radio channel.

8. The wireless device of claim 1, wherein each antenna group of the at least two antenna groups for each antenna group combination comprises a same number of antennas.

9. The wireless device of claim 1, wherein the at least two antenna groups for each antenna group combination comprise at least a same subset of the multiple antennas.

10. The wireless device of claim 1, wherein the at least two antenna groups for each antenna group combination comprise different sets of antennas.

11. The wireless device of claim 4, wherein:
a first set of antennas of the multiple antennas in the primary antenna group of the at least two antenna groups for each antenna group combination are configured for both receive and transmit operations; and
a second set of antennas of the multiple antennas in the one or more secondary antenna groups of the at least two antenna groups for each antenna group combination are configured for receive operations.

12. The wireless device of claim 4, wherein:
a first set of antennas of the multiple antennas in the primary antenna group of the at least two antenna groups for each antenna group combination have at least one of the first or second performance values beyond a threshold; and
a second set of antennas of the multiple antennas in the one or more secondary antenna groups of the at least two antenna groups for each antenna group combination have at least one of the first or second performance values less than the threshold.

13. The wireless device of claim 4, wherein:
a first set of antennas of the multiple antennas in the primary antenna group of the at least two antenna groups for each antenna group combination support a first set of physical channels; and
a second set of antennas of the multiple antennas in the one or more secondary antenna groups of the at least two antenna groups for each antenna group combination support a second set of physical channels.

14. The wireless device of claim 1, wherein the one or more processors, individually or in any combination, are is configured to execute the instructions and further cause the wireless device to statically group the multiple antennas to form the at least two antenna groups for each antenna group combination, based on at least one of: a hardware design of the wireless device or one or more first measurements during a setup the wireless device.

15. The wireless device of claim 1, wherein the one or more processors, individually or in any combination, are configured to execute the instructions and further cause the wireless device to semi-statically group the multiple antennas to form the at least two antenna groups for each antenna group combination, based on information associated with an operation of a connection establishment of the wireless device.

16. The wireless device of claim 1, wherein the one or more processors, individually or in any combination, are configured to execute the instructions and further cause the wireless device to dynamically group the multiple antennas to form the at least two antenna groups for each antenna group combination.

17. The wireless device of claim 1, wherein the one or more processors, individually or in any combination, are configured to execute the instructions and further cause the wireless device to group the multiple antennas to form the at least two antenna groups for each antenna group combination based on at least one of:
a hardware design of the wireless device;
one or more first measurements during a setup the wireless device; and
one or more second measurements during an operation of the wireless device.

18. A method for wireless communications by a wireless device, comprising:
evaluating a plurality of antenna group combinations based on one or more criteria, wherein each antenna group combination comprises at least two antenna groups of multiple antennas and the one or more criteria involve a first performance value calculated separately for each antenna group in an antenna group combination under evaluation and a second performance value calculated collectively for the at least two antenna groups in the antenna group combination under evaluation; and
selecting a subset of the plurality of antenna group combinations, based on the evaluation.

19. The method of claim 18, further comprising selecting an antenna group combination within the subset of the plurality of antenna group combinations having at least one of: a highest first performance value or a highest second performance value.

20. The method of claim 18, further comprising:
determining a total number of antenna group combinations for the multiple antennas, wherein each antenna group combination comprises the at least two antenna groups of the multiple antennas; and
selecting the plurality of antenna group combinations from the total number of antenna group combinations that satisfy a predefined condition, wherein the predefined condition is satisfied when at least one antenna in at least one antenna group of an antenna group combination is configured for both receive and transmit operations.

21. The method of claim 18, wherein the at least two antenna groups for each antenna group combination comprise a primary antenna group and one or more secondary antenna groups.

22. The method of claim 18, wherein the first performance value and the second performance value correspond to spectral efficiency values.

23. The method of claim 18, wherein the first performance value and the second performance value correspond to signal to noise ratio values.

24. The method of claim 18, wherein the first performance value and the second performance value correspond to rank values of a radio channel.

25. The method of claim 18, wherein each antenna group of the at least two antenna groups for each antenna group combination comprises a same number of antennas.

26. The method of claim 18, wherein the at least two antenna groups for each antenna group combination comprise at least a same subset of the multiple antennas.

27. The method of claim 18, wherein the at least two antenna groups for each antenna group combination comprise different sets of antennas.

28. The method of claim 21, wherein:
- a first set of antennas of the multiple antennas in the primary antenna group of the at least two antenna groups for each antenna group combination are configured for both receive and transmit operations; and
- a second set of antennas of the multiple antennas in the one or more secondary antenna groups of the at least two antenna groups for each antenna group combination are configured for receive operations.

29. A non-transitory computer-readable medium comprising instructions that, when executed by a processor of a wireless device, cause the wireless device to perform a method of wireless communications, comprising:
- evaluating a plurality of antenna group combinations based on one or more criteria, wherein each antenna group combination comprises at least two antenna groups of multiple antennas and the one or more criteria involve a first performance value calculated separately for each antenna group in an antenna group combination under evaluation and a second performance value calculated collectively for the at least two antenna groups in the antenna group combination under evaluation; and
- selecting a subset of the plurality of antenna group combinations, based on the evaluation.

30. The non-transitory computer-readable medium of claim 29, wherein the method further comprises selecting an antenna group combination within the subset of the plurality of antenna group combinations having at least one of: a highest first performance value or a highest second performance value.

\* \* \* \* \*